United States Patent
Choi et al.

(10) Patent No.: US 9,237,689 B2
(45) Date of Patent: Jan. 19, 2016

(54) LAWN MOWER ROBOT SYSTEM AND METHOD OF CONTROLLING THE SAME

(75) Inventors: Kyuchun Choi, Seoul (KR); Geunbae Hwang, Seoul (KR); Hyunsup Song, Seoul (KR)

(73) Assignee: LG Electronics Inc., Seoul (KR)

( * ) Notice: Subject to any disclaimer, the term of this patent is extended or adjusted under 35 U.S.C. 154(b) by 607 days.

(21) Appl. No.: 13/565,162

(22) Filed: Aug. 2, 2012

(65) Prior Publication Data

US 2013/0192183 A1  Aug. 1, 2013

(30) Foreign Application Priority Data

Aug. 3, 2011 (KR) ............ 10-2011-0077457

(51) Int. Cl.
*A01B 69/00* (2006.01)
*A01D 34/00* (2006.01)

(52) U.S. Cl.
CPC ...... *A01D 34/008* (2013.01); *G05D 2201/0208* (2013.01); *Y10S 901/01* (2013.01)

(58) Field of Classification Search
USPC ............... 56/10.2 R, 10.2 A, 10.2 F, DIG. 7, 56/DIG. 15; 701/23–28, 50
See application file for complete search history.

(56) References Cited

U.S. PATENT DOCUMENTS

| | | | |
|---|---|---|---|
| 4,851,854 A * | 7/1989 | Drogin | 342/417 |
| 5,426,584 A * | 6/1995 | Kamimura et al. | 701/25 |
| 5,974,347 A | 10/1999 | Nelson | |
| 5,974,348 A * | 10/1999 | Rocks | 701/28 |
| 6,255,793 B1 * | 7/2001 | Peless et al. | 318/580 |
| 6,615,108 B1 * | 9/2003 | Peless et al. | 700/245 |
| 6,674,687 B2 * | 1/2004 | Zeitzew | 367/6 |
| 7,185,478 B1 * | 3/2007 | Willis, II | 56/10.2 A |
| 7,663,485 B2 * | 2/2010 | Kim et al. | 340/572.1 |
| 8,027,761 B1 * | 9/2011 | Nelson | 701/23 |
| 2003/0208304 A1 | 11/2003 | Peless et al. | |
| 2005/0085947 A1 * | 4/2005 | Aldred et al. | 700/253 |
| 2007/0276558 A1 * | 11/2007 | Kim | 701/23 |
| 2008/0109126 A1 * | 5/2008 | Sandin et al. | 701/23 |
| 2010/0023195 A1 * | 1/2010 | Traster | 701/23 |

FOREIGN PATENT DOCUMENTS

| | | | |
|---|---|---|---|
| JP | 2000023531 A | 1/2000 | |
| KR | 100189345 B1 | 6/1999 | |

* cited by examiner

*Primary Examiner* — Alicia Torres
(74) *Attorney, Agent, or Firm* — Dentons US LLP (57) ABSTRACT

A lawn mower robot system, comprising: a lawn mower robot disposed with a moving device; a mowing device disposed in the lawn mower robot and mowing lawns; a first communication device disposed in the lawn mower robot and transmitting an inquiry signal for state information; a plurality of boundary display apparatuses, arranged in a lawn presence region, disposed with a second communication device for receiving the inquiry signal for the state information from the first communication device and for transmitting an acknowledge signal for the state information to the first communication device; a controller for recognizing a plurality of absolute coordinates from the lawn presence region based on the acknowledge signal for the state information received from the second communication device and for controlling the mowing device within the limit of the plurality of absolute coordinates.

11 Claims, 5 Drawing Sheets

LAWN MOWER ROBOT SYSTEM AND METHOD OF CONTROLLING THE SAME

CROSS-REFERENCE TO RELATED APPLICATIONS

The present application claims priority under 35 U.S.C. 119 and 35 U.S.C. 365 to Korean Patent Application No. 10-2011-0077457 (filed on Aug. 3, 2011), which is hereby incorporated by reference in its entirety.

BACKGROUND

The present disclosure relates to a lawn mower robot and a method of controlling the same.

A lawn mower is an apparatus for mowing lawns planted in a home's yard or playground and the like. Such a lawn mower may be classified into a type used at home, and a tractor type used in a wide playground and farm.

The lawn mower for the home is classified into a walk behind type for mowing the lawn while directly dragging the lawn mower from behind, and a directly hand carrying type.

However, there are burdens in that humans should directly operate all of two types of the lawn mower. Particularly, since it is difficult to mow the lawn of a playground by directly operating the lawn mower by an user in today's busy daily life, it is generous to hire outside humans so as to mow the lawns, thereby to generate hiring cost.

SUMMARY

Embodiments provide a lawn mower robot system, and a method of controlling the same.

In one embodiment, a lawn mower robot system comprises a lawn mower robot disposed with a moving device; a mowing device disposed in the lawn mower robot and mowing lawns; a first communication device disposed in the lawn mower robot and transmitting an inquiry signal for state information; a plurality of boundary display apparatuses, arranged in a lawn presence region, disposed with a second communication device for receiving the inquiry signal for the state information from the first communication device and for transmitting an acknowledge signal for the state information to the first communication device; and a controller for recognizing a plurality of absolute coordinates from the lawn presence region based on the acknowledge signal for the state information received from the second communication device and for controlling the mowing device within the limit of the plurality of absolute coordinates.

In another embodiment, a method of controlling a lawn mower robot system comprises transmitting an inquiry signal for state information from a first communication device disposed in a lawn mower robot to each of a plurality of boundary display apparatuses; receiving an acknowledge signal for the state information for the inquiry signal for the state information from a second communication device disposed in each of the plurality of boundary display apparatuses in the first communication device; recognizing an absolute coordinate of the lawn mower robot from a lawn presence region when the first communication device receives the acknowledge signal for the state information from all boundary display apparatuses; and driving a mowing device in the lawn presence region according to the recognized absolute coordinate and mowing lawns.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
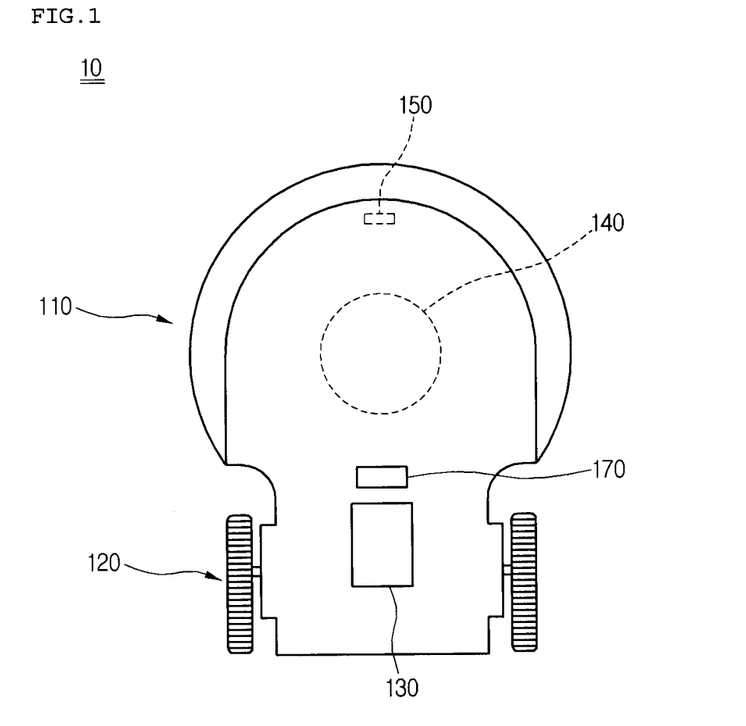
FIG. 1 is a block view for a lawn mower robot according to the present embodiment.
Figure 2:
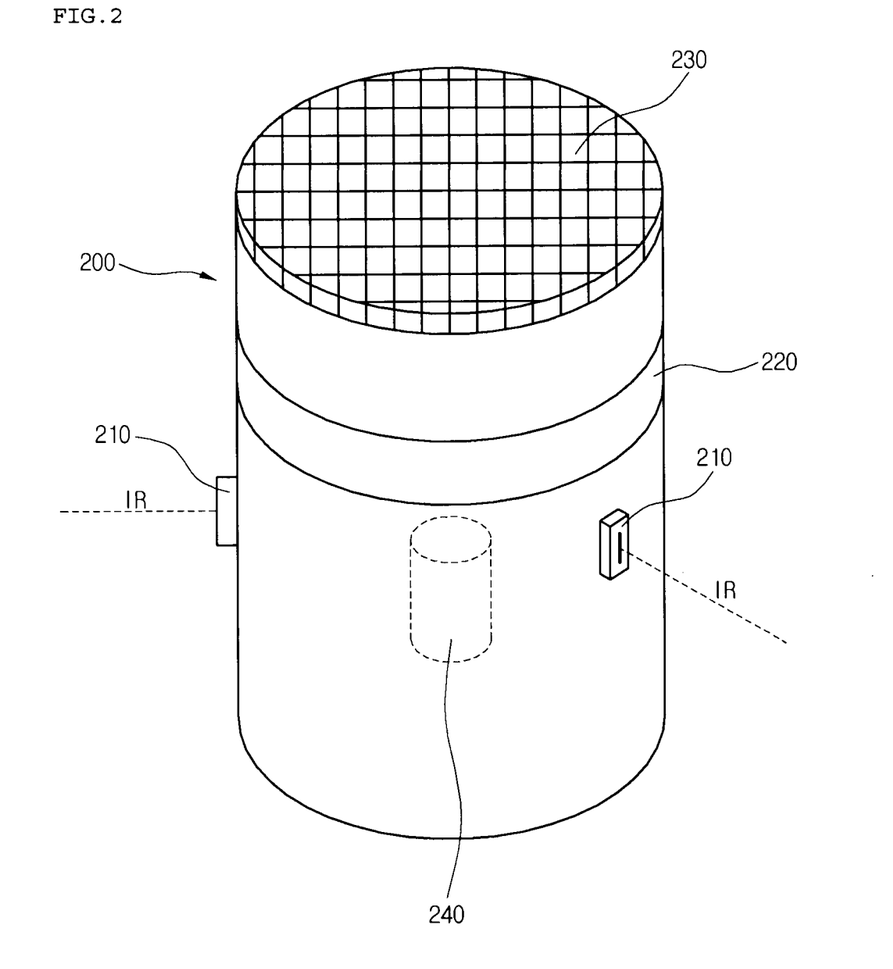
FIG. 2 is a perspective view for a boundary display apparatus according to the present embodiment.
Figure 3:
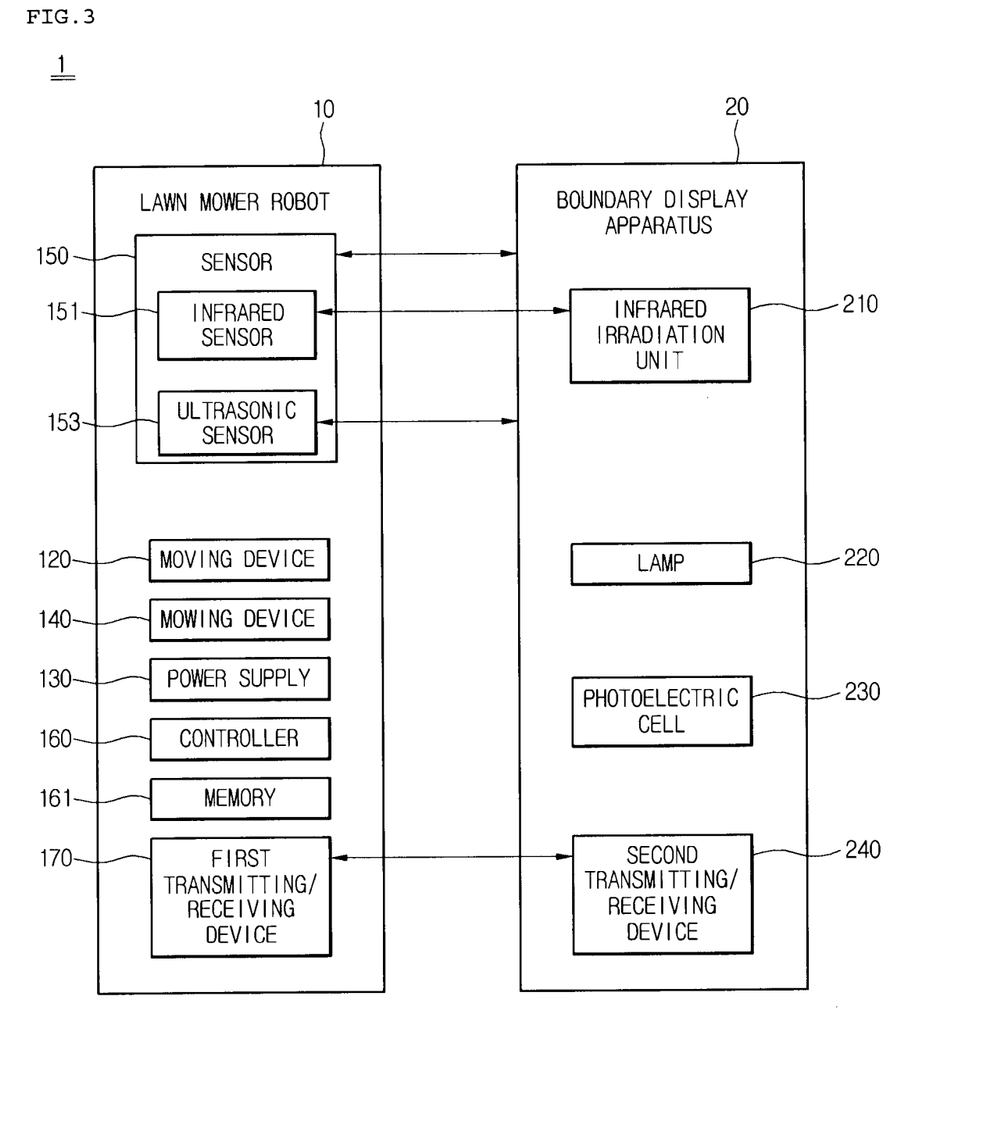
FIG. 3 is a block view for a lawn mower robot according to the present embodiment.

FIG. 1 is a plan view for a lawn mower robot according to the present embodiment, FIG. 2 is a perspective view for boundary display apparatuses according to the present embodiment, and FIG. 3 is a block view for the lawn mower robot according to the present embodiment.

Referring to FIGS. 1 to 3, the lawn mower robot 10 according to the present embodiment includes a body 110 having a moving device 120 and forming an appearance, a mowing device 140 disposed in a bottom of the body 110 and mowing lawns, a sensor 150 disposed in the body 110 and sensing outside information, a power supply 130 supplying power to the lawn mower robot 10, and a controller 160 disposed in the body 110 and controlling various electronic parts.

The body 110 forms the appearance of the lawn mower robot 10, and various electrical/mechanical parts are received in the inside thereof. The body 110 may be disposed with the power supply 130 for supplying power to the lawn mower robot 10.

The power supply 130 may be a chargeable and dischargeable battery (a second cell). The power supply 130 may be charged by outside power. The power supply 130 may be implemented by a replaceable primary cell, and is connected to the outside through lines to receive commercial power supply. Hereinafter, although it is described that the power supply 130 is implemented by the second cell, it is not limited thereto.

The power supply 130 is separately coupled with the body 110, or may be detachably connected to a charging device (not shown) to be supplied with outside current. In this case, the charging device is connected to the outside power to supply current, and the charging device is interactively communicated with the lawn mower robot 10 such that the lawn mower robot 10 returns to the charging device for oneself to charge the power supply 130 by the charging device.

The moving device 120 may move the lawn mower robot 10. The moving device 120 may include a plurality of wheels, and a plurality of motors for separately driving the plurality of wheels. Rotation velocities of the wheels between the plurality of wheels become different by separately controlling the plurality of motors such that direction switching is possible. Each of the plurality of motors is bidirectional rotating motors. Therefore, the lawn mower robot 10 may move forwarded or backward, or left or right.

The sensor 150 may sense objects in the vicinity of the lawn mower robot 10, and sense humans, animals, stationary objects or moving objects and the like.

The sensor 150 may also sense outside temperature or humidity, sunshine intensity, air volume and the like.

The sensor 150 may sense presence or absence of the lawns. The sensor 150 may be implemented by the sensor for sensing at least one of color, perfume and spectrum of the lawns.

The sensor 150 may include at least one of a mechanical sensor, an optical sensor, a chromatic sensor, a radio frequency sensor, a capacitive sensor, an ultrasonic sensor, an infrared ray sensor, a RGB sensor, a spectrum sensor and the like according to the embodiment.

Hereinafter, for example, it is described that the sensor 150 includes the infrared ray sensor 151 for sensing an infrared ray, and the ultrasonic sensor 153 for sensing presence or absence of the boundary display apparatuses 20, but it is limited thereto.

The mowing device 140 is disposed in the body 110, and therefore, mows the lawns. The mowing device 140 is disposed in the bottom of the body 110, thereby to arrange toward the area having the lawn (hereinafter, refer to 'the lawn presence area G'). When the mowing device 140 is driven by a controller 160, the lawns in the lawn presence region G are mowed.

The mowing device 140 may be implemented by a blade type, a circle blade type, a reel type, a line or strand type formed with a cutter with rope, and other well-known cutter and the like according to the embodiment.

The body 110 is disposed with a first transmitting/receiving device 170. The first transmitting/receiving device 170 may transmit/receive specific signal at specific frequency from and to outside transmitting/receiving devices. Bluetooth, RF (Radio Frequency), IrDA (infrared Data Association), UWB (Ultra Wideband), ZigBee, etc. may be uses as the first transmitting/receiving device 170. It is described that the transmitting/receiving devices according to one embodiment of the present invention uses RF (Radio Frequency), but it is not limited thereto.

The first transmitting/receiving device 170 may transmit an inquiry signal for state information for inquiring an on/off state of a second transmitting/receiving device 240, inherent identification number for the second transmitting/receiving device 240, and information for an absolute position of the second transmitting/receiving device 240 to the second transmitting/receiving device 240.

The first transmitting/receiving device 170 may transmit/receive the specific signal from a mobile terminal etc. including a separate PC (Personal computer), a Remote controller, and a smartphone according to the embodiment.

The body 110 is disposed with the controller 160. The controller 160 controls the electronic/mechanical devices disposed in the lawn mower robot 10. The controller 160 controls the above-described moving device 120, the mowing device 140, etc., receives data sensed from the sensor 150 and the like, then, may store it into a memory 161, and may control the electronic/mechanical devices disposed in the lawn mower robot 10 based on the stored data.

The controller 160 controls the first transmitting/receiving device 170 to transmit an acknowledge signal for the state information, and may control electronic/mechanical devices based on the specific signal received from an outside terminal.

Referring to FIGS. 2 and 3, a boundary display apparatuses 20 according to the present invention includes a housing 200 for forming an appearance, a photoelectric cell 230 disposed in the housing and producing current by receiving light, an infrared irradiation unit 210 disposed in the housing 200 and irradiating an infrared ray using the current produced from the photoelectric cell 230, and the second transmitting/receiving device 240 for interactively communicating with the transmitting/receiving device 170.

The housing 200 forms the appearance of the boundary display apparatus 20. The housing 200 may function as an ornament for a graceful landscape according to the embodiment, and may be formed in various shapes.

In FIG. 2, for an example, it is showed that the housing 200 is formed in a cylindrical shape, but it is not limited thereto.

The photoelectric cell 230 receives the light to produce the current. The photoelectric cell 230 may be disposed in the side or top of the housing 200. The photoelectric cell 230 may be implemented by a sunlight cell 230 for producing the current by receiving the sunlight, but the kind of the photoelectric cell 230 is not limited. The current produced from the photoelectric cell 230 may be stored in a power storage unit (not shown) disposed in the housing 200.

The infrared ray irradiation unit 210 is disposed to allow the infrared ray to be irradiated into the outside of the housing 200, and the housing 200 may be disposed with a plurality of the infrared ray irradiation unit 210. Hereinafter, for example, it is described that two infrared irradiation units 210 are spaced apart from each other by a predetermined angle in the housing 200, but the number of the infrared irradiation unit is not limited.

The infrared irradiation unit 210 irradiates the infrared ray into the outside of the housing 200 using the current produced from the photoelectric cell 230. The infrared ray to be irradiated is irradiated in a straight line or may be irradiated in a predetermined angle and range from the infrared irradiation unit 210. Hereinafter, it is described that the infrared irradiation unit 210 irradiates the infrared ray in a straight line, but may irradiate the infrared ray on the two dimensional plan or the three dimensional space in the predetermined range and angle.

The boundary display apparatuses 20 may be disposed with a lamp 220 emitting the light. The lamp 220 is off by day, and may be operated at night. The lamp 220 may be operated using the current produced from the photoelectric cell 230.

As the boundary display apparatuses 20 produce the current using the photoelectric cell 230, the lawn presence area G to be described later may be displayed by irradiating the infrared ray from the infrared irradiation unit 210 by day, and the operated lamp 220 may be used as a lighting that allows the landscape of the lawn presence area G to be graceful at night.

The boundary display apparatuses 20 are disposed with the second transmitting/receiving device 240 capable of interactively communicating with the first transmitting/receiving device 170. The second transmitting/receiving device 240 may transmit/receive the specific signal for the first transmitting/receiving device 170. It is described that the second transmitting/receiving device 240 uses as the same radio frequency (RF) as the first transmitting/receiving device 170, but it is not limited thereto.

When the second transmitting/receiving device 240 receives the inquiry signal for the state information from the first transmitting/receiving device 170, the second transmitting/receiving device 240 transmits the inquiry signal for the state information for delivering an on state of the second transmitting/receiving device 240, an inherent identification number for the second transmitting/receiving device 240, and information for an absolute position of the second transmitting/receiving device 240 to the first transmitting/receiving device 170.

That is, the boundary display apparatuses 20 transmit the acknowledge signal for the state information as a response signal for the inquiry signal for the state information.

Figure 4:
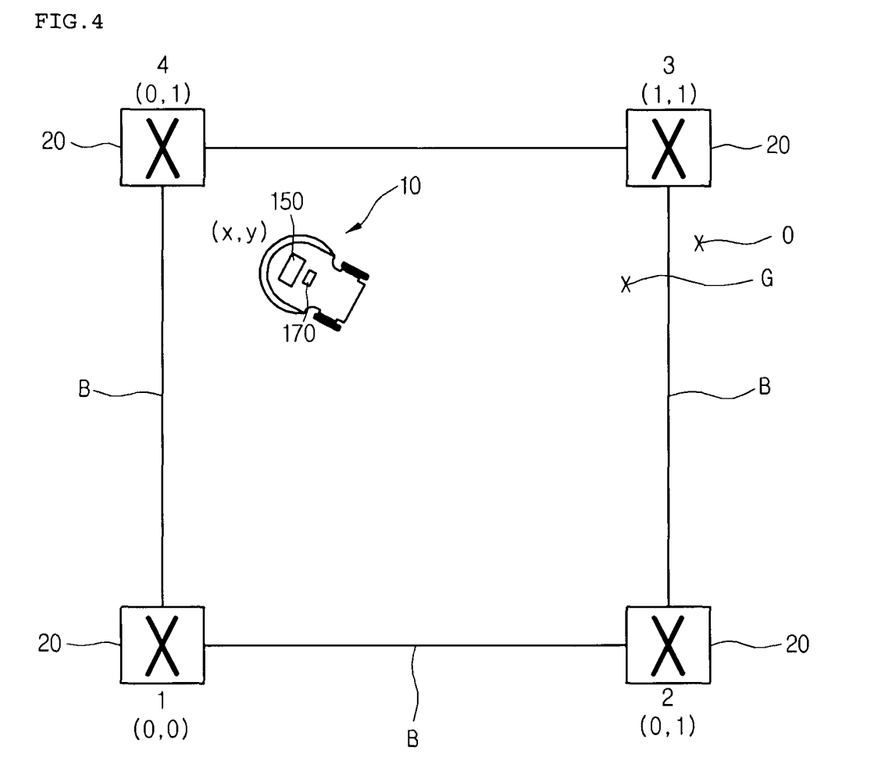
FIG. 4 is a view for the lawn mower robot system 1 and a lawn presence area G according to the present embodiment.

FIG. 4 is a view for the lawn mower robot system 1 and a lawn presence area G according to the present embodiment.

Referring to FIG. 4, the lawn presence area G is defined as the region having the lawn. The region having the lawn is generally partitioned into a lawns planting region in a certain area to distinguish from different area at home or in an industrial environment. In this case, a boundary area B is a boundary for separating the lawn presence region G having the lawns and the other remaining area O (outside region). The boundary area B may form an enclosed path.

Some lawns may be present even on the other remaining region O having not the lawns, but, hereinafter, it is described that a lot of lawns are present in the lawn presence region G based on the boundary area B and the other remaining region O includes soil, concrete, block, road and the like having little lawn or plants.

At least one boundary display apparatuses 20 may be disposed in the lawn presence region G according to the limit of the lawn presence region.

In FIG. 4, for an example, the lawn presence region G is defined as a rectangle by four boundary display apparatuses 20, but it is not limited thereto.

The boundary display apparatuses 20 display the boundary area B of the lawn presence region G by the infrared ray irradiated from the infrared irradiation unit 210. The boundary display apparatuses 20 form apexes of each of the rectangle, the infrared ray irradiated from each of the infrared ray irradiation unit 210 forms segments of the rectangle, and the rectangle including the segments and the apexes forms the boundary area B. At this time, the region in the inside of the boundary area B becomes the lawn presence region G.

The sensor 150 may include the infrared ray sensor 151, and the infrared ray sensor 151 may sense the infrared ray irradiated from the infrared irradiation unit 210. The sensor 150 senses the infrared ray while moving in the lawn presence region G and transmits the sensed result to the controller 160.

The sensor 150 may include the ultrasonic sensor 153, and the ultrasonic sensor 153 may sense presence or absence of the boundary display apparatuses 20. When the sensor 150 meets the boundary display apparatuses 20 while moving in the lawn presence region G, it senses the presence or absence of the boundary display apparatuses and therefore, transmits the sensed result to the controller 160.

The controller 160 controls the moving device 120 and/or the mowing device 140 according to the sensed result of the sensor 150. When the controller 160 receives the sensed result of the infrared ray, the controller 160 may control to allow the moving device 120 to be moved along the boundary area B formed by the infrared ray.

The controller 160 recognizes an absolute coordinate <x,y> of the lawn mower robot 10 in the lawn presence region G by the acknowledge signal for the state signal received from the second transmitting/receiving device 240 of at least one boundary display apparatuses 20. As shown in FIG. 4, when having four boundary display apparatuses 20, a first boundary display apparatus 20 is indicated as the absolute coordinate <0,0>, a second boundary display apparatus 20 is indicated as the absolute coordinate <0,1>, a third boundary display apparatus 20 is indicated as the absolute coordinate <1,1>, and a fourth boundary display apparatus 20 is indicated as the absolute coordinate <1, 0>.

The inside limit of the absolute coordinate displayed by the first to fourth boundary display apparatuses 20 forms the above-described lawn presence region. That is, the sections positioned with the first to fourth boundary display apparatuses 20 corresponds to corners of the boundary area B.

The controller 160 may recognize a current coordinate <x, y> on the basis of the absolute coordinate corresponding to each corner in the lawn presence region G. The controller 160 recognizes the current coordinate <x,y> by calculating distance or direction etc. with the second transmitting/receiving device 240 in each corner.

Further, the controller 160 compares arrival velocity of the acknowledge signal for the state information transmitted to the first transmitting/receiving device 170 or strength of signal transmitted from the second transmitting/receiving device 240, etc. and therefore, may recognize the current absolute coordinate <x, y>.

The controller 160 recognizes the current coordinate <x, y> of the lawn mower robot in the absolute coordinates <0,0>, (1,0), <1,1>, <0,1>, and drives the mowing device 140 within the limit of the absolute coordinate displayed by the first to fourth boundary display apparatuses 20.

In the case that the body 110 is deviated from the lawn presence region G, the controller 160 may stop the mowing device 140. The controller 160 may recognize to allow the body 110 to be deviated from the lawn presence region G by the current coordinate in the situations, to be not produced commonly, such as slidingness due to a slope or a compulsory movement caused by an outside situation while moving the lawn mower robot.

When the body 110 is deviated from the lawn presence region G, the body 110 may be overturned, and the mowing device 140 disposed in the bottom of the body 110 may be exposed outside. In this case, the controller 160 stops the mowing device 140 to prevent an user, an outside or pets and plants from injuring or damaging by the mowing device 140

Further, when the body 110 is deviated from the lawn presence region G, the controller 160 may stop the moving device 120.

Figure 5:
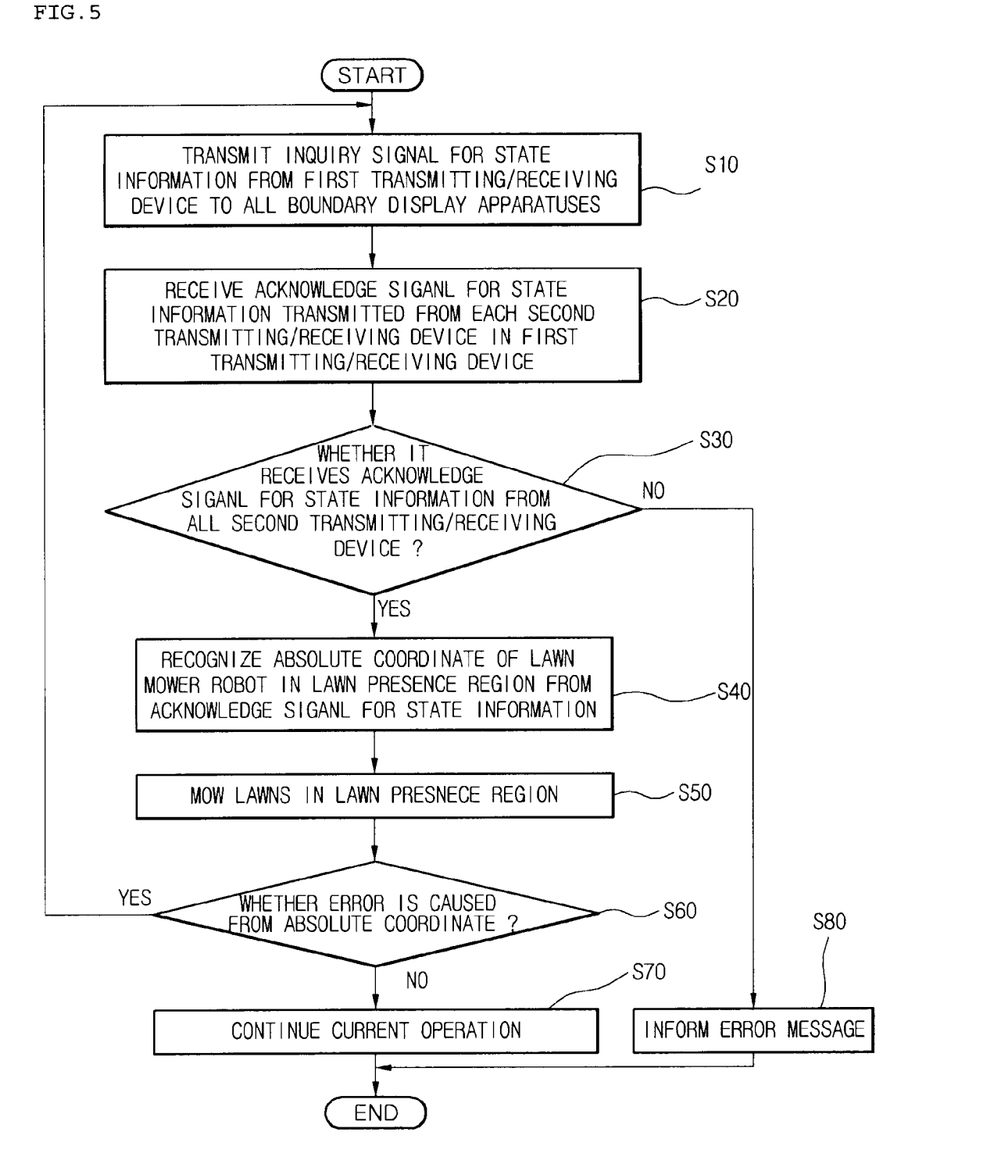
FIG. 5 is a flow chart for describing a method of controlling the lawn mower robot system 1 according to the present embodiment.

FIG. 5 is a flow chart for describing a method of controlling the lawn mower robot system 1 according to the present embodiment.

Referring to FIG. 5, the method of controlling the lawn mower robot system 1 is described.

First, the lawn mower robot 10 is turned on. The lawn mower robot 10 is initially turned on in the lawn presence region G, or the lawn mower robot 10 is turned on outside the lawn presence region and then it may be moved into the lawn presence region G.

When the lawn mower robot 10 is turned on, the controller transmits the inquiry signal for the state signal from the first transmitting/receiving device 170 disposed in the lawn mower robot 10 to all the boundary display apparatuses 20 (S10).

As described above, the inquiry signal for the state information may include signals for inquiring the on/off state of the second transmitting/receiving device 240, the inherent identification number for the second transmitting/receiving device 240, and information for the absolute position of each of the second transmitting/receiving device 240.

That is, the second transmitting/receiving device 240 disposed in each of the first to fourth boundary display apparatuses 20 receives the inquiry signal for the state information in the present embodiment.

The second transmitting/receiving device 240 disposed in each of the first to fourth boundary display apparatuses 20 transmits the response signal for the inquiry signal for the state information, that is, the acknowledge signal for the state information to the first transmitting/receiving device 170.

The acknowledge signal for the state information may include the on state of the second transmitting/receiving device 240, the inherent identification number for the second transmitting/receiving device 240, and the information for the absolute position.

The first transmitting/receiving device 170 receives the acknowledge signal for the state information from the second transmitting/receiving device 240 disposed in each of the boundary display apparatuses 20 (S20).

Further, the controller 160 determines whether it receives the acknowledge signal for the state information from the second transmitting/receiving device 240 of all the boundary display apparatuses 20 (S30).

At this time, the number of the boundary display apparatuses 20 may be already input to the lawn mower robot 10 through an input section.

On determining at step S30, when the acknowledge signal for the state information is not received from at least one second transmitting/receiving device 240, an error message is informed from the lawn mower robot to the outside (S80). The user recognizes the error message informed outside, and repairs the second transmitting/receiving device 240 included in the boundary display apparatuses 20.

On determining at step S30, when the acknowledge signal for the state information is received from the second transmitting/receiving device 240 of all the boundary display apparatuses 20, the controller 30 recognizes the absolute coordinate of the lawn mower robot in the lawn presence region G (S40).

In this case, as shown in FIG. 4, the current absolute coordinate in the lawn presence region is recognized on the basis of four boundary display apparatuses 20. The controller 160 recognizes the absolute coordinate <x, y> for the current position within the limit of at least three absolute coordinates displayed by the first to fourth boundary display apparatuses 20, drives the mowing device 140 within the limit of the absolute coordinate displayed by the first to fourth boundary display apparatuses 20, and then, mows the lawn in the lawn presence region G (S50).

After recognizing the absolute coordinate, on mowing the lawn or moving in the lawn presence region G, the error from the absolute coordinate of the lawn mower robot 10 may be caused by the slope of the ground or obstacle or trespassing humans or animals.

When the error is caused from the absolute coordinate, the error is caused on driving the mowing device 140 by the lawn mower robot 10 in the lawn presence region G, and therefore, the mowing device 140 may be driven outside the lawn presence region G as well.

To prevent this, the controller 160 determines whether the error is caused from the absolute coordinate of the lawn mower robot 10 (S60). When the error is not caused from the absolute coordinate, the current operation is continually implemented (S70), and the mowing device 140 is continually driven and the lawns are continually mowed as an embodiment.

When the error is caused from the absolute coordinate, the controller 160 controls the first transmitting/receiving device 170 to transmit the inquiry signal for the state information to the second transmitting/receiving device 240 of all the boundary display apparatuses 20 again.

The first transmitting/receiving device 170 transmits the inquiry signal for the state information to all the second transmitting/receiving device 240 again, and the second transmitting/receiving device 240 which receives the inquiry signal for the state information transmits the acknowledge signal for the state information to the first transmitting/receiving device 170 again.

The first transmitting/receiving device 170 receives the acknowledge signal for the state information from each of the second transmitting/receiving device 240 again (S20). The controller 160 analyzes the acknowledge signal for the state information received from the second transmitting/receiving device 240, thereby to determine the absolute coordinate again.

According to an embodiment of the present invention, the lawn mower robot is disposed with the first transmitting/receiving device and the boundary display apparatuses are disposed with the second transmitting/receiving device. Therefore, since the first transmitting/receiving device is interactively communicated with the second transmitting/receiving device, the lawn mower robot determines the absolute position in the lawn presence region for oneself to mow the lawns.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mower robot system, comprising:
a lawn mower robot with a moving device;
a mowing device in the lawn mower robot for mowing lawns;
a first communication device in the lawn mower robot for transmitting an inquiry signal for state information;
a plurality of boundary display apparatuses, arranged in a lawn presence region, with a second communication device for receiving the inquiry signal for the state information from the first communication device and for transmitting an acknowledge signal for the state information to the first communication device; and
a controller for recognizing a plurality of absolute coordinates from the lawn presence region based on the acknowledge signal for the state information received from the second communication device, for determining a current coordinate of the lawn mower based on the plurality of absolute coordinates, and for controlling the mowing device within a limit of the plurality of absolute coordinates based on the determined current coordinate and the plurality of absolute coordinates, wherein when the lawn mower robot is deviated from the limit of the plurality of absolute coordinates, the first communication device transmits an inquiry signal for state information to each of the plurality of boundary display apparatuses and receives an acknowledge signal for the state information for the inquiry signal for the state information from the second communication device; and wherein the controller recognizes a new absolute coordinate of the lawn mower robot from a lawn presence region when the first communication device receives the acknowledge signal for the state information from all the boundary display apparatuses.

2. The lawn mower robot system according to claim 1, wherein the first and the second communication devices use a radio frequency.

3. The lawn mower robot system according to claim 1, wherein the controller stops the mowing device and the moving device when the lawn mower robot is deviated from the limit of the plurality of absolute coordinates.

4. The lawn mower robot system according to claim 1, wherein each of the plurality of boundary display apparatuses include an infrared ray irradiation unit for displaying the lawn presence region to irradiate an infrared ray.

5. The lawn mower robot system according to claim 4, wherein the lawn mower robot includes a sensor for sensing the infrared ray irradiated from the infrared ray irradiation unit.

6. The lawn mower robot system according to claim 1, wherein when the first communication device does not receive the acknowledge signal for the state information from at least one of the plurality of the boundary display apparatuses, the lawn mower robot generates an error message.

7. The lawn mower robot system according to claim 6, wherein the lawn mower robot includes an input section for inputting a number of the boundary display apparatuses.

8. A method of controlling a lawn mower robot system, comprising:

transmitting an inquiry signal for state information from a first communication device in the lawn mower robot to each of a plurality of boundary display apparatuses;

receiving an acknowledge signal for the state information for the inquiry signal for the state information from a second communication device in each of the plurality of boundary display apparatuses in the first communication device;

recognizing an absolute coordinate of the lawn mower robot from a lawn presence region when the first communication device receives the acknowledge signal for the state information from all the boundary display apparatuses; and driving a mowing device in the lawn presence region according to the recognized absolute coordinate and mowing lawns, automatically recognizing, by a controller, the absolute coordinate when the lawn mower robot is deviated from a limit of the plurality of absolute coordinates, wherein the automatically recognizing comprises:

transmitting an inquiry signal for state information from the first communication device to each of the plurality of boundary display apparatuses;

receiving an acknowledge signal for the state information for the inquiry signal for the state information from the second communication device; and recognizing a new absolute coordinate of the lawn mower robot from a lawn presence region when the first communication device receives the acknowledge signal for the state information from all the boundary display apparatuses, and wherein when the first communication device does not receive the acknowledge signal for the state information from at least one of the plurality of the boundary display apparatuses, the lawn mower robot generates an error message.

9. The method according to claim 8, further comprising inputting a number of the boundary display apparatuses to the lawn mower robot.

10. The method according to claim 8, wherein the controller stops the mowing device when the lawn mower robot is deviated from the limit of the plurality of the absolute coordinates.

11. The method according to claim 8, wherein the controller stops the moving device for moving the lawn mower robot when the lawn mower robot is deviated from the limit of the plurality of the absolute coordinates.

* * * * *